(12) United States Patent
Predl

(10) Patent No.: US 11,639,595 B2
(45) Date of Patent: May 2, 2023

(54) PREFABRICATED PART WITH A CONCRETE BODY

(71) Applicant: Predl GmbH, Boenitz (DE)

(72) Inventor: Manfred Predl, Schmerkendorf (DE)

(73) Assignee: Predl GmbH, Boenitz (DE)

( * ) Notice: Subject to any disclaimer, the term of this patent is extended or adjusted under 35 U.S.C. 154(b) by 579 days.

(21) Appl. No.: 16/794,596

(22) Filed: Feb. 19, 2020

(65) Prior Publication Data
US 2021/0170628 A1 Jun. 10, 2021

(30) Foreign Application Priority Data
Dec. 6, 2019 (DE) .................. 202019004970.3

(51) Int. Cl.
| | | |
|---|---|---|
| F16L 58/10 | (2006.01) | |
| F16L 58/18 | (2006.01) | |
| F16L 25/00 | (2006.01) | |
| E03B 7/09 | (2006.01) | |
| E03F 5/02 | (2006.01) | |

(52) U.S. Cl.
CPC ............... E03B 7/09 (2013.01); E03F 5/025 (2013.01); E03F 2005/028 (2013.01)

(58) Field of Classification Search
CPC ...... E03F 2005/028; E03F 5/025; E03B 7/09; F16L 9/08; F16L 21/03; F16L 21/035; F16L 25/0027; F16L 55/02
See application file for complete search history.

(56) References Cited

U.S. PATENT DOCUMENTS

| | | | | |
|---|---|---|---|---|
| 2,042,132 A | * | 5/1936 | Treskow ............ | F16L 25/0027 138/175 |
| 2015/0323104 A1 | * | 11/2015 | Subacchi ............ | F16L 58/1063 138/109 |
| 2016/0214275 A1 | * | 7/2016 | Müller .................. | B28B 21/94 |
| 2017/0106562 A1 | * | 4/2017 | Müller .................. | F16L 58/185 |
| 2018/0282978 A1 | * | 10/2018 | Predl .................... | B29C 51/10 |
| 2020/0370685 A1 | | 11/2020 | Schlüsselbauer | |

FOREIGN PATENT DOCUMENTS

| | | | | |
|---|---|---|---|---|
| DE | 2541999 A | * | 3/1977 | ............... E02B 3/16 |
| DE | 3713207 A1 | | 3/1988 | |
| DE | 10215059 A1 | | 2/2003 | |
| DE | 102010043758 A1 | | 5/2012 | |
| EP | 0556533 A1 | | 8/1993 | |
| WO | 2019148218 A1 | | 8/2019 | |

* cited by examiner

*Primary Examiner* — Benjamin F Fiorello
*Assistant Examiner* — Stacy N Lawson
(74) *Attorney, Agent, or Firm* — Smartpat PLC

(57) ABSTRACT

A prefabricated part comprises a concrete body that has the form of a pipe section with two pipe ends and a pipe inner side. The pipe inner side is lined at least in some areas by a lining made of plastic material connected to the concrete body, and at least one of the pipe ends is covered at least in some areas by a molded part made of plastic material connected to the concrete body. At least the pipe end, which is covered at least in some areas, has a connecting joint in order to connect the pipe end to a pipe end of a further prefabricated part. The lining consists of a thermoplastic material and the molded part consists of a thermosetting plastic. The lining and the molded part are connected to each other in a sealed manner.

32 Claims, 4 Drawing Sheets

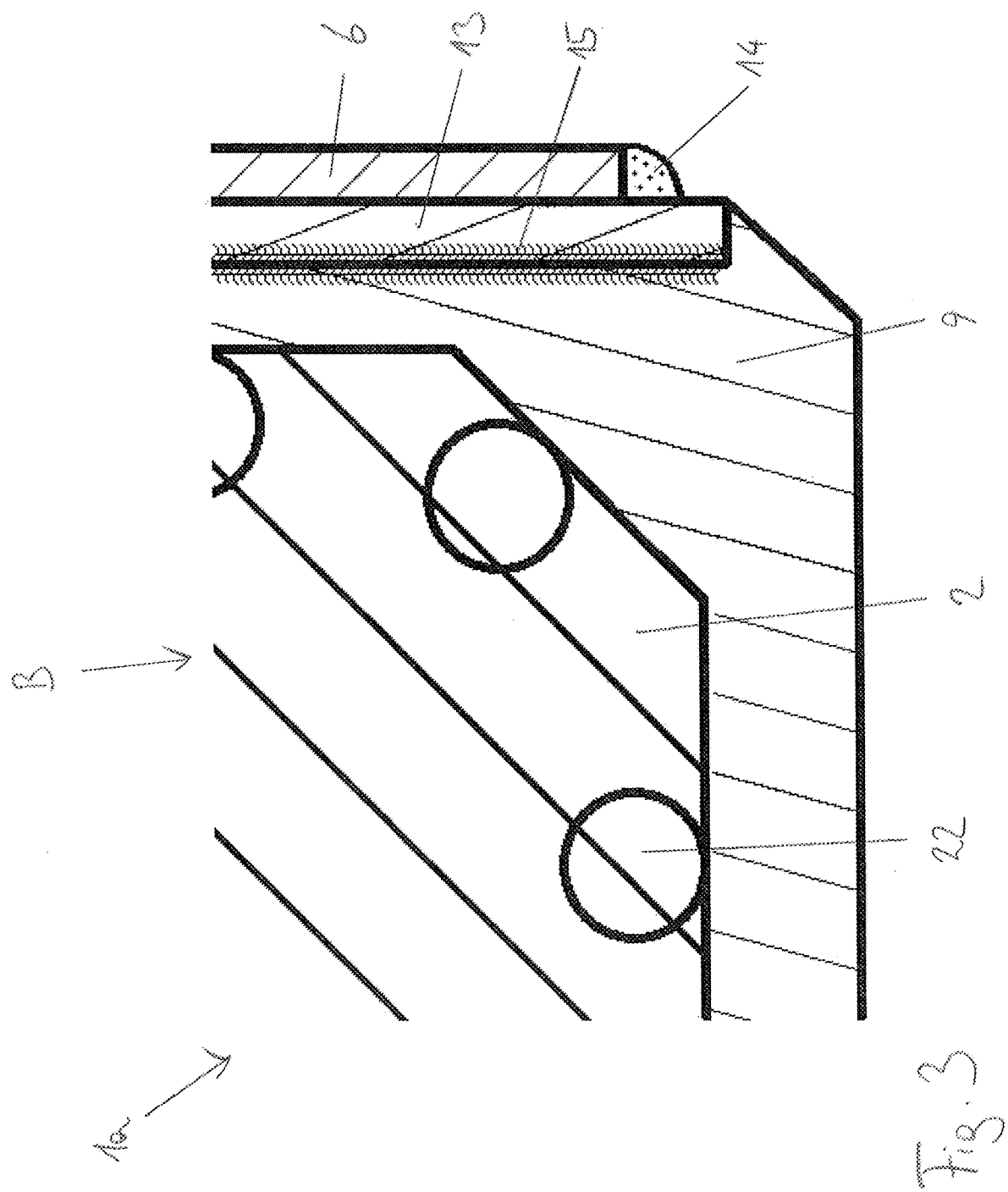

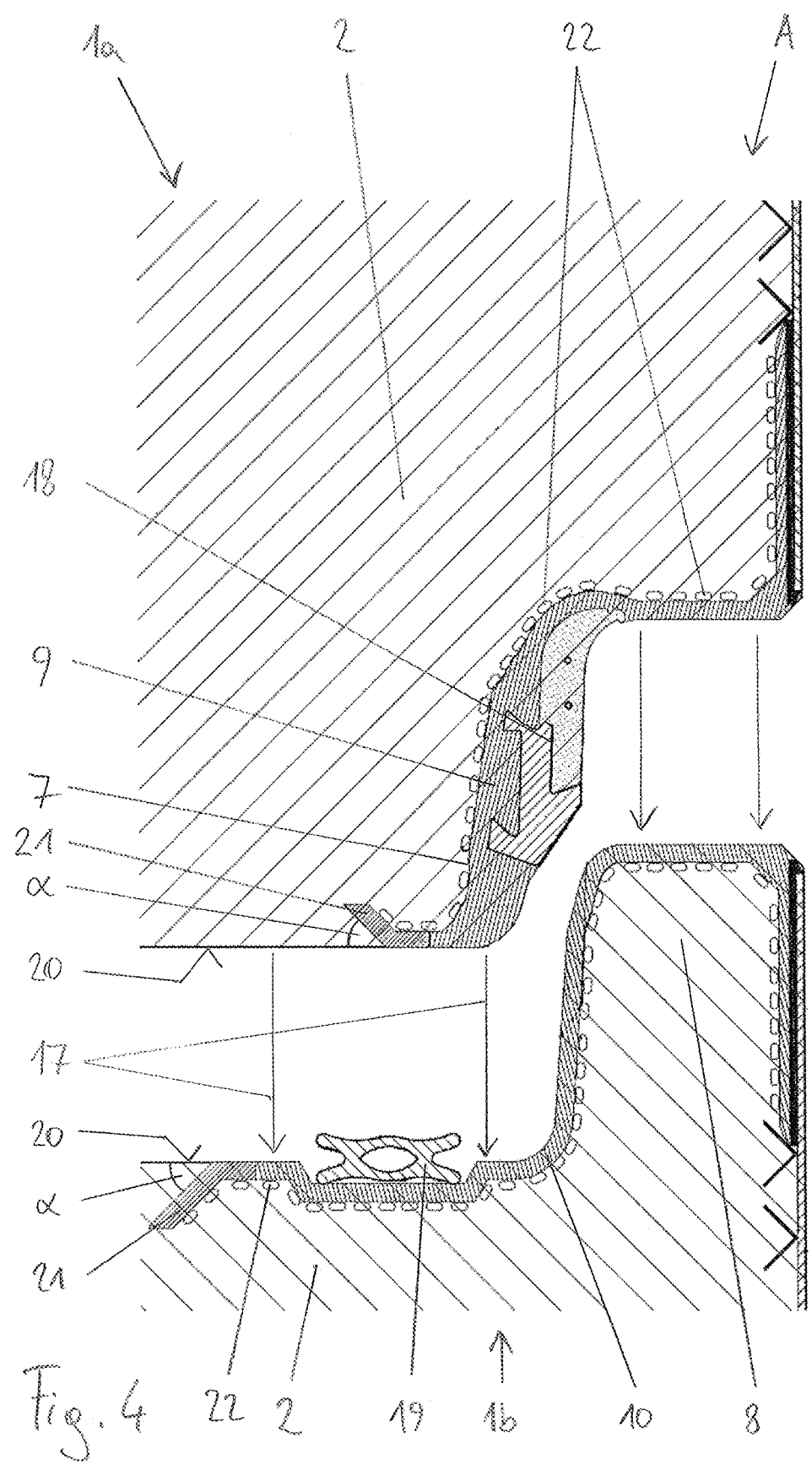

PREFABRICATED PART WITH A CONCRETE BODY

TECHNICAL FIELD

The disclosure relates to a prefabricated part with a concrete body which can be connected to like parts for building shafts, e.g. sewage shafts.

BACKGROUND

For the construction of shafts, in particular sewage shafts, pipe-section-shaped prefabricated parts are generally used. These are positioned on site on top of or adjacent to each other and connected to each other. As such, conventional prefabricated parts for shaft construction have matching joint profiles, such as socket and spigot ends, at their ends. To connect two prefabricated parts, the spigot end of one prefabricated part is inserted into the socket of the other prefabricated part. A seal or a sealing agent can be arranged between the socket and the spigot end.

Since concrete surfaces are relatively rough and do not have a particularly high chemical resistance, it is particularly advantageous in shaft construction if the pipe-section-shaped prefabricated concrete parts are lined with plastic, at least on their pipe inner side. Such a plastic lining is preferably designed as smooth as possible, such that few deposits can adhere to it. Furthermore, the lining can be made of a material with high chemical resistance, such that any aggressive chemicals found in the shaft do not attack the shaft wall.

In principle, both thermoplastic and thermosetting plastics are suitable for lining a prefabricated concrete element for shaft construction. Both types of plastics can be produced with a sufficiently smooth surface and both thermoplastics and thermosetting plastics with high chemical resistance are available.

A simple component, such as a lining for the pipe inner side of the prefabricated part, can be manufactured particularly cost-effectively from a thermoplastic, since a thermoplastic can be produced in sheet form by means of extrusion, for example, and then bent to fit and welded together to form a pipe.

The production of a more complex component, such as a cover for a connecting joint (for example, a socket or spigot ends) of a prefabricated part made of concrete, which also has a large internal diameter (for example, >0.6 m), from a thermoplastic material, is somewhat more expensive because a correspondingly large and expensive injection mold is required. Above all, however, thermoplastics generally have a high coefficient of thermal expansion. If such components are stored in an outdoor area, they must first be brought into a certain temperature range prior to further processing (for example, bonding with concrete) in order to avoid excessive form deviations.

With a thermosetting plastic, on the other hand, the production of a complex component is not significantly more expensive or more complex than the production of a simple component, as long as the component is not produced by injection molding. For example, a component made of thermosetting plastic can be produced by first shaping a flexible fiber mat and then impregnating it with curing resin. Similarly, a component made of thermosetting plastic can be produced by preforming a fast-curing plastic mixture, for example in several layers, onto a negative mold. In such cases, the costs of producing a complex component is lower than the costs of producing the same component made of a thermoplastic.

Thus, the advantages of thermosetting plastics are, on the one hand, that the production of a complex component from a thermosetting plastic can be less expensive than the production of the same component from a thermoplastic. In particular, however, thermosetting plastics generally have a much lower coefficient of thermal expansion than thermoplastics, such that, in the case of components made of thermosetting plastics, no significant changes in size occur even during external storage.

SUMMARY

The disclosure is based on the task of providing a prefabricated part of the aforementioned type, the pipe-section-shaped concrete body of which is tightly covered with plastic on its inner side and at its ends in the area of connecting joints, and which can be produced easily and economically.

This task is solved with a prefabricated part as claimed.

The lining of the prefabricated part is made of a thermoplastic and the molded part is made of a thermosetting plastic. The lining and the molded part are connected to each other in a sealed manner. Thus, the advantages of producing components from thermoplastics and thermosetting plastics, along with the material properties of these two types of plastics, can be combined. For example, the lining, as an essentially simple component, can be produced at low cost by bending an extruded sheet made of thermoplastic material to the appropriate length and width and welding it together to form a pipe.

The molded part, as a complex component, can be produced, for example, by first shaping an initially flexible fiber mat and then impregnating it with curing resin, or by preforming a curing plastic mixture, for example in several layers, onto a negative mold. In doing so, both types of production are more cost-effective than the production of the molded part as an injection molded part made of a thermoplastic or thermosetting material.

Preferably, the molded part and the lining overlap each other in an overlap area, wherein the overlap area runs along the inner side of the molded part. This enables an all-round tight connection between the molded part and the lining.

In order for the plastics of the lining and the molded part, which are typically not easily weldable together, to be able to be joined together, a strip of a thermoplastic material may be arranged in the overlap area between the molded part and the lining. The strip is connected to the molded part by one or more fasteners, which is/are at least partially embedded or accommodated in both the strip and the molded part. In addition, the strip is connected to the lining by a joint. The joint can be a welded connection, for example, since both the strip and the lining consist of a thermoplastic material. The strip may also be bonded to the lining in addition to or instead of being welded.

When producing the prefabricated part, the molded part already connected to the strip by one or more fasteners and the lining can be placed in a casting mold. The flowable concrete is then placed in the casting mold. As soon as the concrete has cured, the molded part and the lining are partially embedded in or connected to the concrete body.

The lining and/or the molded part may have anchoring elements, such as bonding bridges, to connect them even more firmly to the cured concrete body. For example, the bonding bridges of the lining can be formed directly on the lining; for example, they can be formed during extrusion or fixed in the course of the production of the lining. Upon the production of the molded part, granules, preferably sand, in particular quartz sand, can be embedded or pushed into material, which is not yet cured, of the molded part, such that the granules form bonding bridges to connect the molded part with the concrete body.

Preferably, the joint between the strip and the lining is only created after the concrete body has cured. This makes it easier to position and align the lining and the molded part in the casting mold prior to or during the pouring of the concrete.

Preferably, the fastener(s) is/are embedded in the strip by being pushed or pressed into the heated and deformable strip during or immediately after the production of the strip, for example by means of extrusion molding or extrusion. Pushing or pressing in takes place, for example, with a roller. However, it is also possible to push the fastener(s) into the strip only later, for example by heating it again and making it malleable. It is important that the fastener(s) are not pushed completely into the strip, but that parts or sections of them are located outside the strip and preferably protrude from the strip.

The fastener(s) is/are connected to the molded part by applying the strip already provided with the fastener(s) to the molded part, which is not yet cured, made of thermosetting plastic, or by enclosing the parts of the fastener(s) protruding from the strip by the thermosetting plastic, which is not yet cured. For example, the strip is applied to the molded fiber mat before or while it is impregnated with resin, such that the fastener(s) is/are also impregnated with resin or is/are embedded in the resin. It is also conceivable that the strip is placed in a negative mold before a curing plastic mixture is preformed onto it and the fastener(s) is/are enclosed by the plastic mixture, before it cures. In both cases, a portion of the fastener(s) is/are accommodated and anchored in both the strip and the molded part, such that, after the resin or plastic mixture has cured, a strong and tight connection is formed between the strip and the molded part.

In a particularly preferred embodiment, the fastener(s) is/are fibers or threads, in particular of plastic and/or a natural material such as cotton. The fibers or threads can be arranged in a textile fabric, for example a woven fabric, a felt or a fleece.

It is also possible that the fastener(s) is/are a pin(s) and/or one or more strap(s) and/or a rod(s) and/or a wire(s) and/or one or more grids. Such a fastener(s) is/are made in particular of plastic or metal. A combination of several fasteners, possibly made of different materials, is also possible.

The connecting joint is preferably a socket, which is lined by the molded part at least in some areas, or a spigot end, which is encased by the molded part at least in some areas. Within this disclosure, all pipe connecting joints that are inserted into each other in the axial direction of the pipe section are considered to be socket and spigot ends. Such connections may also be referred to as bell and spigot or tongue and groove joints In particular, the socket or spigot end, as the case may be, is covered or encased by the molded part to such an extent that, if there is a connection consisting of such a socket and spigot end, and possibly a sealing agent arranged in between, no section of the concrete body can come into contact with any liquid present in the shaft.

In a preferred embodiment, the molded part, which extends from the pipe inner side in the direction of the pipe outer side and is arranged on the surface of the concrete body in the area of the connecting joint, has a closing edge at its outer edge. This projects at an angle from the surface on the front side of the concrete body into the interior of the concrete body and runs a little way into the concrete body. The closing edge forms a kind of water barrier and prevents ground water, which is pushed from the outside into a gap between two connected prefabricated parts, from penetrating between the molded part and the concrete body.

It is particularly preferred if the concrete body has a connecting joint, for example a socket and/or spigot end, at both ends. Preferably, with such an embodiment, both ends are covered, at least in some areas, by a molded part, wherein both molded parts are tightly connected to the lining, as already described.

The concrete body preferably has the shape of a round pipe section with a circular cross-section. However, it may also have an angular, in particular square, cross-section, preferably with rounded corners, or any other cross-section, for example an egg-shaped cross-section. The molded parts are each adapted to the shape of the cross-section of the concrete body, and accordingly also have an essentially circular, egg-shaped, rectangular or other shape.

The strip or, if applicable, the strips is/are arranged in particular along the pipe inner side of the concrete body, since in this case the strip(s) can be produced or extruded in an extrusion process and bent together into a ring shape (or into another shape adapted to the cross-section of the concrete part).

The preferred thermosetting plastic used is polyurea. The thermoplastic material used is preferably polyethylene (PE) or polypropylene (PP). Such plastics all have a high chemical resistance. The lining and the strip(s), if any, may be made of the same thermoplastic material or of different thermoplastics, as long as such thermoplastics are weldable.

A shaft may consist of two or more than two of the disclosed prefabricated parts. At least two adjoining prefabricated parts are connected to each other via the connecting joints. Preferably, the connecting joints of such a shaft are socket and spigot ends, such that the individual prefabricated parts are connected to each other via socket-spigot end connections, with sealing agents, if necessary, accommodated therein. The shaft is, for example, a vertical or horizontal shaft, but may also be a pipeline.

The sealing agent between two adjacent connecting joints, in particular between the socket and the spigot end, can be, for example, a sealing cord or a kind of bituminous sealing tape, which is arranged between the connecting joints and is squeezed between them when the connecting joints, in particular the spigot end with the socket, are connected.

However, embodiments with which a seal serving as a sealing agent is incorporated in one of the molded parts, for example in the molded part in the area of the socket or in the molded part in the area of the spigot end, or in both molded parts, are particularly preferred. Such a seal or seals may be in one or more parts and/or may be made of another plastic material, for example an elastomer, and/or may be cast, embedded or preformed into the molded part upon its manufacture.

The sealing agent prevents water from penetrating through the gap between the two prefabricated parts into the interior of the plastic-lined, interconnected prefabricated parts.

A damping element, such as a load transfer ring accommodated between the connecting joints, may also be arranged between two prefabricated parts of the shaft. Temporary force peaks or force surges acting vertically on the prefabricated parts, which occur, for example, as a result of vehicles driving over the shaft, are weakened. This reduces the risk of cracks occurring in the prefabricated parts due to the force peaks.

A prefabricated part can also be closed at one end by a shaft bottom. Preferably, the lining of such a prefabricated element covers not only the pipe inner side but also the side of the shaft bottom facing inwards.

It is also possible that in the case of a prefabricated part with a shaft bottom or a prefabricated part with two open pipe ends, pipe connection openings, which lead into an interior of the concrete body, are provided. In such a case, the lining has corresponding openings in the area of the pipe connection openings.

The following detailed description is merely exemplary in nature and is not intended to limit the invention or the application and uses of the invention. Furthermore, there is no intention to be bound by any theory presented in the preceding background or the following detailed description.

BRIEF DESCRIPTION OF THE DRAWINGS

FIG. 3 is an enlarged sectional view, which shows a detail B of the connection between the molded part, the strip and the lining from FIG. 2.

FIG. 4 is an additional enlarged sectional view, which shows the detail A of the connection of the prefabricated parts shown in FIG. 1 according to an alternative embodiment.

DETAILED DESCRIPTION

Figure 1:
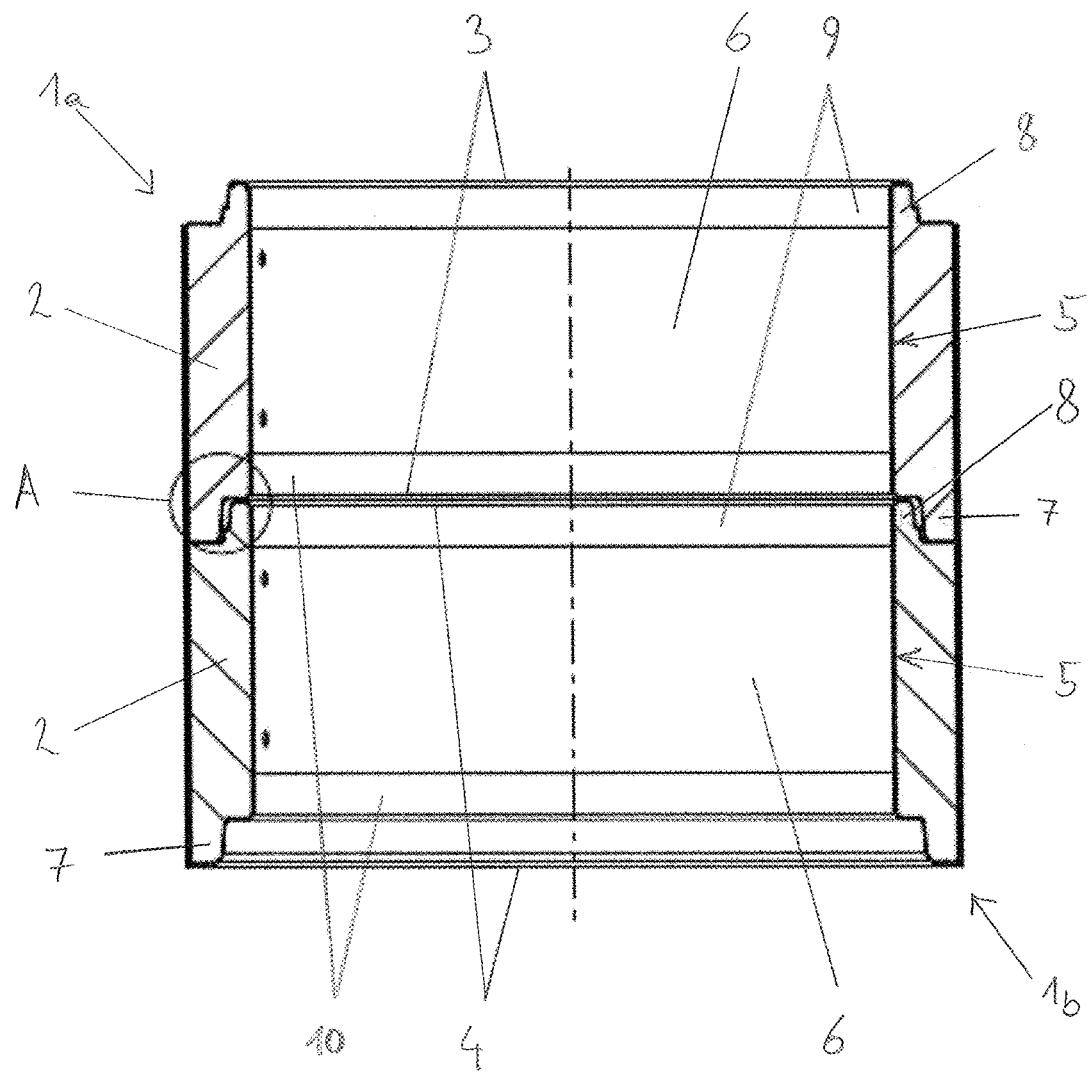
FIG. 1 shows a longitudinal section through two interconnected prefabricated parts.

FIG. 1 shows two prefabricated parts 1a, 1b, which are inserted with their ends into each other and which are essentially constructed in the same manner. Each of the prefabricated parts 1a, 1b has a concrete body 2 in the form of a pipe section with two pipe ends 3, 4 and a pipe inner side 5.

A lining 6 connected to the concrete body 2, which is made of a thermoplastic material, is arranged on the pipe inner side 5 of the prefabricated part 1a, 1b. In order to produce the lining 6, preferably an extruded plastic sheet is cut to length, bent into a pipe shape and welded or bonded along an axially running seam (not shown).

Each of the pipe ends 3, 4 of the prefabricated parts 1a, 1b has a connecting joint that is suitable for a connection with a connecting joint of an adjacent prefabricated part 1b, 1a. In the exemplary embodiment, one pipe end 3 of each prefabricated part 1a, 1b has a socket 7 and the other pipe end 4 has a matching spigot end 8.

In the embodiment shown, the pipe ends 3, 4 of each prefabricated part 1a, 1b are covered at least in some areas by a molded part 9, 10 made of a thermosetting plastic.

Figure 2:
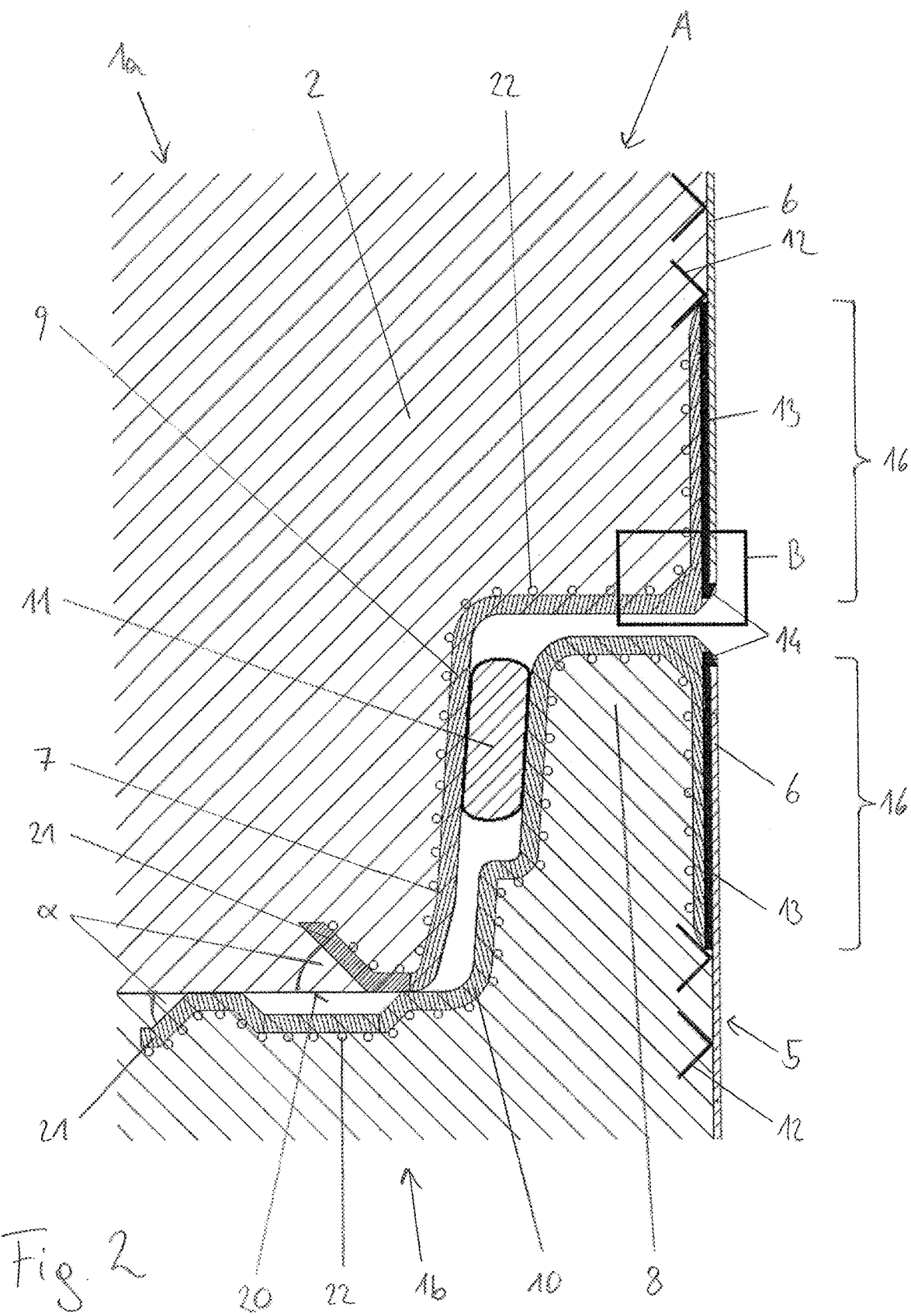
FIG. 2 is an enlarged sectional view, which shows a detail A of the connection of the prefabricated parts shown in FIG. 1.

FIG. 2 shows a detail A of the socket-spigot end connection between the two prefabricated parts 1a, 1b shown in FIG. 1. Therein, the spigot end 8 of the prefabricated part 1b shown in FIG. 1 below is accommodated in the socket 7 of the prefabricated part 1a shown in FIG. 1 above.

FIG. 2 shows that the socket 7 of the upper prefabricated part 1a is lined by the molded part 9, which is located in the area of the socket 7. The spigot end 8 of the lower prefabricated part 1b accommodated in such socket 7 is encased by the molded part 10, which is located in the area of the spigot end 8.

A gap is formed between the spigot end 8 of the lower prefabricated part 1b and the socket 7 of the upper prefabricated part 1a to accommodate a sealing agent 11, which in the embodiment shown is a sealing cord pressed into the gap.

The concrete body 2 of each prefabricated part 1a, 1b is preformed, in particular cast, to the respective lining 6 and the respective molded parts 9, 10. The lining 6 is additionally anchored in the respective concrete body 2 by means of bonding bridges 12.

The lining 6 and the molded parts 9, 10 overlap each other in an overlap area 16 running circularly along the pipe inner side 5.

For the prefabricated parts 1a, 1b, a strip 13 running in a circular manner is arranged in each of the overlap areas 16 between the lining 6 and the molded part 9 in the area of the socket 7 or between the lining 6 and the molded part 10 in the area of the spigot end 8. The strips 13 are made of a thermoplastic material, preferably the same thermoplastic material as the linings 6.

Each of the strips 13 is welded to the lining 6 along weld seams 14 running in a circular manner and can be additionally or instead glued flat to the linings 6.

FIG. 3 shows a detail B from FIG. 2 in the overlap area 16 in the area of the socket 7 of the upper prefabricated part 1a. In the overlap area 16, the molded part 9 is connected to the strip 13 and the strip 13 is connected to the lining 6.

The molded parts 9, 10, the strips 13 and the linings 6 are connected in the same manner in the area of the spigot end 8 of the upper prefabricated part 1a and in the area of the socket 7 and the spigot end 8 of the lower prefabricated part 1b.

The lining 6 is connected to the strip 13 via the weld seam 14. Since both the strip 13 and the lining 6 are made of a thermoplastic material, preferably the same thermoplastic material, they can be easily and tightly welded together in the usual manner.

The strip 13 and the molded part 9 are connected to each other by fastener(s) in the form of fibers 15, which are arranged as a fabric web. At least some of the fibers 15 are accommodated or embedded in both the molded part 9 and the strip 13. In the embodiment shown, the fasteners are fibers 15, but other fasteners, such as pins, a grid, etc., may also be used.

Preferably, the fibers 15 in the form of the fabric web are already pushed or pressed into the strip 13 during production. For example, the fibers 15 are at least partially rolled into the strip 13 immediately after extrusion, while the temperature of the strip 13 is still above the deformation temperature of the thermoplastic material of the strip 13.

A strip 13 provided in this manner with the fibers 15 is preferably arranged on or pushed into the other molded part 9—and in the same manner also upon the production of the other molded part 10—before the thermosetting plastic of the molded part 9, 10 has cured. After the thermosetting plastic material has cured, the fibers 15 are at least partially accommodated and anchored in the molded part 9, 10, such that a tight connection is formed between the molded part 9, 10 and the strip 13.

Instead of or in addition to the fibers 15, other connecting elements such as pins, brackets or rods or some kind of braid or lattice structure made of plastic or even metal may be used. It is essential that the fasteners used can be embedded both in the molded part 9, 10 and in the strip 13.

FIG. 4 shows detail A of the socket-spigot end connection between the two prefabricated parts 1a, 1b shown in FIG. 1 according to an alternative embodiment. Therein, the spigot end 8 of the prefabricated part 1b shown in FIG. 1 below is not yet fully accommodated in the socket 7 of the prefabricated part 1a shown in FIG. 1 above. The arrows 17 indicate that prefabricated parts 1a, 1b must be brought even closer together in order to form the connection between the socket 7 and the spigot end 8.

A seal 18 is incorporated into the molded part 9 of the socket 7; this serves as a sealing agent 11. As in the case shown, the seal 18 can consist of several sealing bodies, or only one single sealing body. The seal 18 is preferably made of an elastic plastic or elastic plastics, in particular elastomer(s).

Preferably, the seal 18 is connected to the molded part 9 by casting, embedding, molding or preforming into the molded part 9 upon production. In the embodiment shown, the molded part 9 of the socket 7 is an injection molded part, wherein the seal 18 was first placed in the injection mold and then the thermosetting plastic was injected into the mold. After the molded part 9 has cured, the seal 18 is connected to it.

When the socket 7 and the spigot end 8 are pushed together, the seal 18 is squeezed between the molded part 9 of the socket 7 and the molded part 10 of the spigot end 8, and seals a gap formed between the prefabricated parts 1a, 1b.

FIG. 4 also shows a damping element 19 designed as a load transfer ring that supports the prefabricated part 1a shown above when the socket-spigot end connection is assembled. The damping element 19 absorbs shocks that are transferred from the prefabricated part 1a shown above to prefabricated part 1b shown below, due to, for example, temporarily occurring vertical forces.

Embodiments with which the seal 18 is molded into the molded part 10 of the spigot end 8 or with which seals 18 are molded into both molded parts 9, 10 are also possible.

In the embodiments shown, the molded parts 9, 10 have additional bonding bridges 22, which are formed by a granulate, for example sand, which is bonded to the molded parts 9, 10 during or after production. When preforming the concrete body 2 to the respective molded part 9, 10, the bonding bridges 22 are enclosed by the flowable concrete, such that the molded part 9, 10 is better anchored in the cured concrete via the bonding bridges 22.

Each of the molded parts 9, 10 runs from the pipe inner side 5 in the direction of a pipe outer side (not shown). The molded part 9, 10 ends between the spigot end 8 or the socket 7 encased by the molded part 10 and the pipe outer side, as the case may be, in a closing edge 22. Unlike the remaining molded parts 9, 10, the closing edge 22 does not run along the surface 21 of the concrete body 2; rather, it projects at an angle α from the surface 21 into the interior of the concrete body 2 and is enclosed by it.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

LIST OF REFERENCE SIGNS 1 (a, b) Prefabricated part
2 Concrete body
3 Pipe end
4 Other pipe end
5 Pipe inner side
6 Lining
7 Socket
8 Spigot end
9 Molded part (socket)
10 Molded part (spigot end)
11 Sealing agent
12 Bonding bridge (lining)
13 Strip
14 Weld seam
15 Fibers
16 Overlap area
17 Arrows
18 Seal
19 Damping element
20 Surface
21 Closing edge
22 Bonding bridge (molded part)
α Angle

What is claimed is:

1. A prefabricated part, comprising:
a prefabricated concrete body which has the shape of a pipe section with two pipe ends and a pipe inner side,
wherein the pipe inner side is at least partially lined by a lining made of plastic material connected to the concrete body, and
wherein at least a first of the two pipe ends is at least partially covered by a molded part made of plastic material connected to the concrete body, and
wherein at least the first of the two pipe ends has a connecting joint in order to connect the first of the two pipe ends to a further pipe end of a further prefabricated part, and
wherein the lining consists of a thermoplastic material, and
wherein the molded part consists of a thermosetting plastic material, and
wherein the lining and the molded part are connected to each other in a sealed manner, and
wherein the molded part and the lining overlap each other in an overlap area, and
wherein a strip made of a thermoplastic material is arranged in the overlap area between the molded part and the lining.

2. The prefabricated part according to claim 1,
wherein the strip is connected to the molded part by at least one fastener, which is at least partially embedded or accommodated in both the strip and the molded part, and
wherein the strip is connected to the lining by a joining connection.

3. The prefabricated part according to claim 2,
wherein the at least one fastener is connected to the strip by pushing the at least one fastener into the strip while the strip is heated and malleable during production of the strip.

4. The prefabricated part according to claim 2,
wherein the at least one fastener is connected to the molded part by embedding the at least one fastener in the molded part while the molded part has not yet cured during production of the molded part.

5. The prefabricated part according to claim 2,
wherein the at least one fastener comprises fibers or threads.

6. The prefabricated part according to claim 5,
wherein the at least one fastener is a textile fabric selected from the group consisting of a woven fabric, a felt, and a fleece.

7. The prefabricated part according to claim 2,
wherein the at least one fastener comprises one or more of a pin, a strap, a rod, a wire, or a grid.

8. The prefabricated part according to claim 7,
wherein the at least one fastener consists of plastic or metal.

9. The prefabricated part according to claim 2,
wherein a second of the two pipe ends is at least partially covered by a second molded part made of a thermosetting plastic material,
wherein the second of the two pipe ends has a second connecting joint in order to connect the second of the two pipe ends to a second further pipe end of a second further prefabricated part, and
wherein the lining and the second molded part are connected to each other in a sealed manner.

10. The prefabricated part according to claim 9,
wherein the second molded part and the lining overlap along a second overlap area,
wherein, in the second overlap area between the second molded part and the lining, a second strip of a thermoplastic material is arranged, and
wherein the second strip is connected to the second molded part and to the lining in the same manner as the strip is connected to the molded part and the lining.

11. The prefabricated part according to claim 9,
wherein the second connecting joint is a socket that is at least partially lined by the second molded part.

12. The prefabricated part according to claim 9,
wherein the second connecting joint is a spigot end that is at least partially encased by the second molded part.

13. The prefabricated part according to claim 9,
wherein the second molded part is arranged on the concrete body in the same manner as the molded part.

14. The prefabricated part according to claim 2,
wherein the strip is arranged in an area of the pipe end on the pipe inner side.

15. The prefabricated part according to claim 2,
wherein the lining and the strip are made of the same thermoplastic material.

16. The prefabricated part according to claim 1,
wherein the molded part and the lining are connected to the concrete body by casting a flowable material of the concrete body onto the molded part and the lining during production of the concrete body.

17. The prefabricated part according to claim 1,
wherein the connecting joint is a socket that is at least partially lined by the molded part.

18. The prefabricated part according to claim 1,
wherein the connecting joint is a spigot end that is at least partially encased by the molded part.

19. The prefabricated part according to claim 1,
wherein the molded part extends from the pipe inner side in the direction of an outer side of the pipe,
wherein the molded part is arranged in an area of the connecting joint on a surface of the concrete body, and
wherein the molded part has a closing edge that extends into the concrete body and projects at an angle from the surface of the concrete body into an interior of the concrete body, the closing edge being arranged between the connecting joint and the pipe outer side.

20. The prefabricated part according to claim 1,
wherein the concrete body has an angular or round cross-sectional shape.

21. The prefabricated part according to claim 1,
wherein the thermosetting plastic is a polyurea and/or wherein the thermoplastic is a polyethylene or polypropylene.

22. The prefabricated part according to claim 1,
wherein the lining has bonding bridges that are anchored in the concrete body, and
wherein the bonding bridges are formed or preformed on the lining.

23. The prefabricated part according to claim 1,
wherein the molded part has bonding bridges that are anchored in the concrete body, and
wherein the bonding bridges are formed from a granulate which is bonded to the molded part.

24. A shaft, comprising at least two prefabricated parts as in claim 1 arranged next to each other and connected to each other via the parts' respective connecting joints.

25. The shaft according to claim 24,
wherein at least one of the at least two prefabricated parts has a socket and another of the at least two prefabricated parts has a spigot end accommodated therein.

26. The shaft according to claim 25,
wherein a sealing agent is arranged between the socket and the spigot end.

27. The shaft according to claim 26,
wherein the sealing agent has at least one seal that is molded or preformed onto the molded part having the socket and/or onto the molded part having the spigot end.

28. The shaft according to claim 24,
wherein a damping element is arranged between the at least two prefabricated parts, and
wherein the damping element is suitable for damping force shocks transmitted from one of the at least two prefabricated parts to another of the at least two prefabricated parts.

29. A shaft, comprising more than two prefabricated parts as in claim 1 that are arranged next to each other and are connected to each other via the parts' respective connecting joints.

30. The prefabricated part according to claim 1,
wherein the prefabricated part and the further prefabricated part are identical.

31. The prefabricated part according to claim 1,
wherein the strip is welded to the lining along a circular weld seam.

32. The prefabricated part according to claim 1,
wherein the strip is connected to the molded part by a fabric web, and
wherein the fabric web comprises fibers that have been pushed into the strip and fibers that have been pushed into the molded part.

* * * * *